United States Patent
Lines et al.

(10) Patent No.: US 9,922,787 B2
(45) Date of Patent: Mar. 20, 2018

(54) METHOD FOR CLOSING AN ELECTRICAL POWER SUPPLY CIRCUIT OF AN ELECTRIC APPARATUS LOCATED IN A CHAMBER AT A CONTROLLED VARIABLE PRESSURE AND RELATED DEVICE

(71) Applicant: COMMISSARIAT A L'ENERGIE ATOMIQUE ET AUX ENERGIES ALTERNATIVES, Paris (FR)

(72) Inventors: Jean-Francois Lines, Le Teich (FR); Jeremy Chargy, Salles (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/311,279

(22) PCT Filed: May 18, 2015

(86) PCT No.: PCT/EP2015/060838
§ 371 (c)(1),
(2) Date: Nov. 15, 2016

(87) PCT Pub. No.: WO2015/177065
PCT Pub. Date: Nov. 26, 2015

(65) Prior Publication Data
US 2017/0076889 A1    Mar. 16, 2017

(30) Foreign Application Priority Data
May 20, 2014  (FR) ..................... 14 54522

(51) Int. Cl.
*H01H 35/14*    (2006.01)
*H01H 37/76*    (2006.01)
(Continued)

(52) U.S. Cl.
CPC ............. *H01H 37/767* (2013.01); *B01D 7/00* (2013.01); *H01H 35/24* (2013.01); *H01H 37/04* (2013.01); *H01H 37/32* (2013.01); *H01H 87/00* (2013.01)

(58) Field of Classification Search
CPC ...... H01H 37/767; H01H 37/04; H01H 37/32; H01H 35/24; B01D 7/00
(Continued)

(56) References Cited

U.S. PATENT DOCUMENTS

2007/0068782 A1* 3/2007 Harper ................. H01H 35/346
200/83 R

FOREIGN PATENT DOCUMENTS

| DE | 10 2009 053 146 B3 | 1/2011 |
|---|---|---|
| FR | 1.336.235 | 8/1963 |
| WO | 2014/048495 A1 | 4/2014 |

OTHER PUBLICATIONS

International Search Report dated Aug. 28, 2015 in PCT/EP2015/060838, filed May 18, 2015.
(Continued)

*Primary Examiner* — Thomas Skibinski
(74) *Attorney, Agent, or Firm* — Oblon, McClelland, Maier & Neustadt, L.L.P.

(57) ABSTRACT

A method for closing an electrical power supply circuit of an electric apparatus located in a chamber at a controlled variable pressure. The method includes heating which provides energy to an element made of electrically conductive material located in the enclosure which is open to the chamber pressure; sublimation of the element made of electrically conductive material once the latter reaches a given temperature, if the pressure conditions in the chamber correspond to the conditions required for an operation of the electric apparatus under vacuum; ejection of vapor particles of the electrically conductive material which result from the
(Continued)

sublimation; and formation of a deposit of electrically conductive material between the two electrically conductive terminals as a consequence of the ejection of the vapor particles.

9 Claims, 3 Drawing Sheets

(51) Int. Cl.
    *B01D 7/00*         (2006.01)
    *H01H 35/24*       (2006.01)
    *H01H 37/04*       (2006.01)
    *H01H 37/32*       (2006.01)
    *H01H 87/00*       (2006.01)

(58) Field of Classification Search
    USPC .......................................... 307/117; 200/83 R
    See application file for complete search history.

(56) References Cited

OTHER PUBLICATIONS

French Search Report dated Mar. 30, 2015 in French Application 1454522, filed May 20, 2014.

\* cited by examiner

METHOD FOR CLOSING AN ELECTRICAL POWER SUPPLY CIRCUIT OF AN ELECTRIC APPARATUS LOCATED IN A CHAMBER AT A CONTROLLED VARIABLE PRESSURE AND RELATED DEVICE

TECHNICAL FIELD AND PRIOR ART

The invention relates to a method for closing an electrical power supply circuit of an electric apparatus located in a chamber at a controlled variable pressure and the related device.

The invention is applicable to the securement of electric equipment intended to operate under vacuum and the start-up of which is desired to be prevented beyond a given pressure level.

Many devices exist in the field of securement of electric apparatuses that have to operate under vacuum. These devices are made either using mechanical actuators, commonly called pressure switches, either using systems equipped with electronic measuring instruments. In any cases, it is the closing of the electrical circuit to which belongs the electric apparatus which allows the operation of the apparatus following a pressure measurement.

In the case of mechanical actuators, the closing of the electrical circuit is generally made by the relative displacement of two mechanical parts which carry the pins of the electric apparatus to be operated. The displacement of the mechanical parts results from the pressure difference which exists between the pressure measured in the chamber in which the electric apparatus is located and the pressure of a sealed reference chamber. The sealed reference chamber is filled with a liquid or a gas. Unless otherwise provided, the reference chamber is thus subjected to thermal variations, which variations induce pressure variations in the liquid or gas. Thereby, there is a bias in the reference pressure delivered by the reference chamber.

In the case of the systems equipped with electronic measuring instruments, several components intervene among which an electronic system vacuum measuring gauge which analyses and processes the pressure measurement of the chamber in which the electric apparatus is located and an actuator, or relay, which closes the electrical circuit based on the information delivered by the gauge. Such systems comprise many circuits and electronic components and have, consequently, a restricted reliability.

The invention does not have the above mentioned drawbacks.

DISCLOSURE OF THE INVENTION

Indeed, the invention relates to a method for closing an electrical power supply circuit of an electric apparatus located in a chamber at a controlled variable pressure, the electrical power supply circuit comprising an open circuit defined between two electrically conductive terminals. The method of the invention comprises:
  a heating, for example by Joule effect, which provides energy to an element made of electrically conductive material, for example an electrically conductive filament, located in the enclosure which is open to the chamber pressure,
  a sublimation of the element made of electrically conductive material once the latter reaches a given temperature, if the pressure conditions in the chamber correspond to the conditions required for an operation of the electric apparatus under vacuum,
  an ejection of vapour particles of the electrically conductive material which result from the sublimation, and
  a formation of a deposit of electrically conductive material between the two electrically conductive terminals as a consequence of the ejection of the vapour particles.

According to a further characteristic of the method of the invention, if the pressure conditions prevailing in the chamber do not correspond to the conditions required for the operation of the electric apparatus under vacuum, the sublimation of the conductive material does not occur and no deposit is formed between the electrically conductive terminals.

The invention also relates to a device for closing an electrical power supply circuit of an electric apparatus located in a chamber at a controlled variable pressure, the electrical power supply circuit comprising an open circuit defined between two electrically conductive terminals of the electrical power supply circuit. The device comprises:
  an enclosure which is open to the chamber pressure, both electrically conductive terminals being formed on an internal wall of the enclosure, the wall being made of an electrically insulating material,
  an element made of electrically conductive material is located in the enclosure, facing the open circuit, and
  a heating device for heating the element made of electrically conductive material is able to lead to a sublimation of the electrically conductive material once the latter reaches a given temperature, if the pressure conditions in the chamber correspond to the condition required for operating the electric apparatus under vacuum.

According a further characteristic of the device of the invention, the element made of electrically conductive material is attached on at least one internal wall of the enclosure which is open to the chamber pressure and both electrically conductive terminals ($E_1$, $E_2$) are made, on an internal wall of the enclosure, by electrically conductive tracks located opposite to each other and facing the element made of an electrically conductive material.

One advantage of the method of the invention is its simple implementation. This simplicity provides a significant warranty of safety. Indeed, only the pressure conditions required for a proper operation of the electric apparatus allow for the sublimation of the element made of electrically conductive material, which sublimation results in forming the short circuit which closes the power supply circuit of the electric apparatus.

BRIEF DESCRIPTION OF THE DRAWINGS

Further characteristics and advantages of the invention will appear upon reading preferential embodiments made in reference to the appended figures, from which.

Throughout the figures, the same references designate same elements.

DETAILED DISCLOSURE OF EMBODIMENTS OF THE INVENTION

Figure 1:
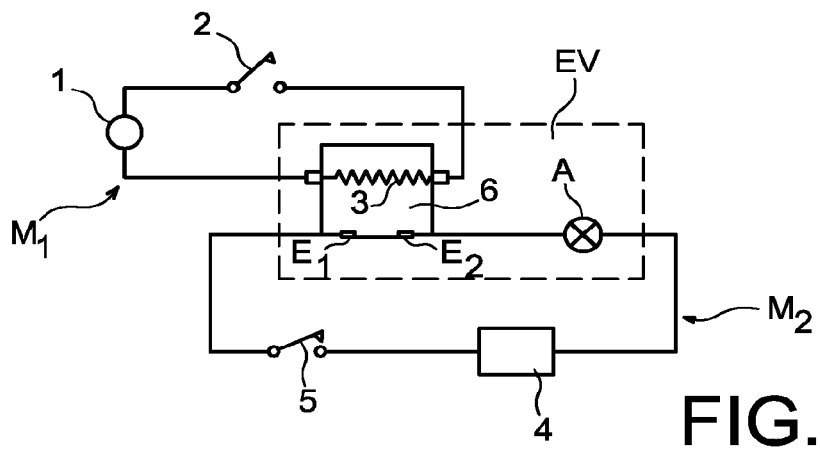
FIG. 1 represents the schematic diagram of a device for closing an electrical power supply circuit of an electric apparatus according to a first embodiment of the invention.

FIG. 1 represents the schematic diagram of a device for closing an electrical power supply circuit of an electric apparatus according to a first embodiment of the invention.

The device comprises two electrical meshes $M_1$, $M_2$. A first mesh $M_1$ comprises an electrical source 1 capable of heating, for example by Joule effect, a switch 2 and an element made of electrically conductive material 3, for example a filament of electrically conductive material. The second mesh $M_2$ comprises an electrical power supply 4, a switch 5, an open circuit defined between the ends $E_1$ and $E_2$ of a break in the electrically conductive line which takes part in the second mesh and the electric apparatus A intended to operate under vacuum, for example a vacuum bulb. The open circuit defined between the ends $E_1$ and $E_2$ is located opposite to the element made of the electrically conductive material 3.

The electric apparatus A is located in a chamber EV at a controlled variable pressure. The pressure in the chamber EV is provided—a priori—to allow for the proper operation of the electric apparatus. Among the different elements described above, in addition to the electric apparatus A, the chamber EV contains at least the open circuit defined between the ends $E_1$ and $E_2$ and the element made of electrically conductive material 3. Preferentially, the open circuit defined between the ends $E_1$ and $E_2$ and the element made of electrically conductive material 3 are placed inside an enclosure 6 which is open to the chamber pressure EV and made of an electrically insulating material.

Figure 5:
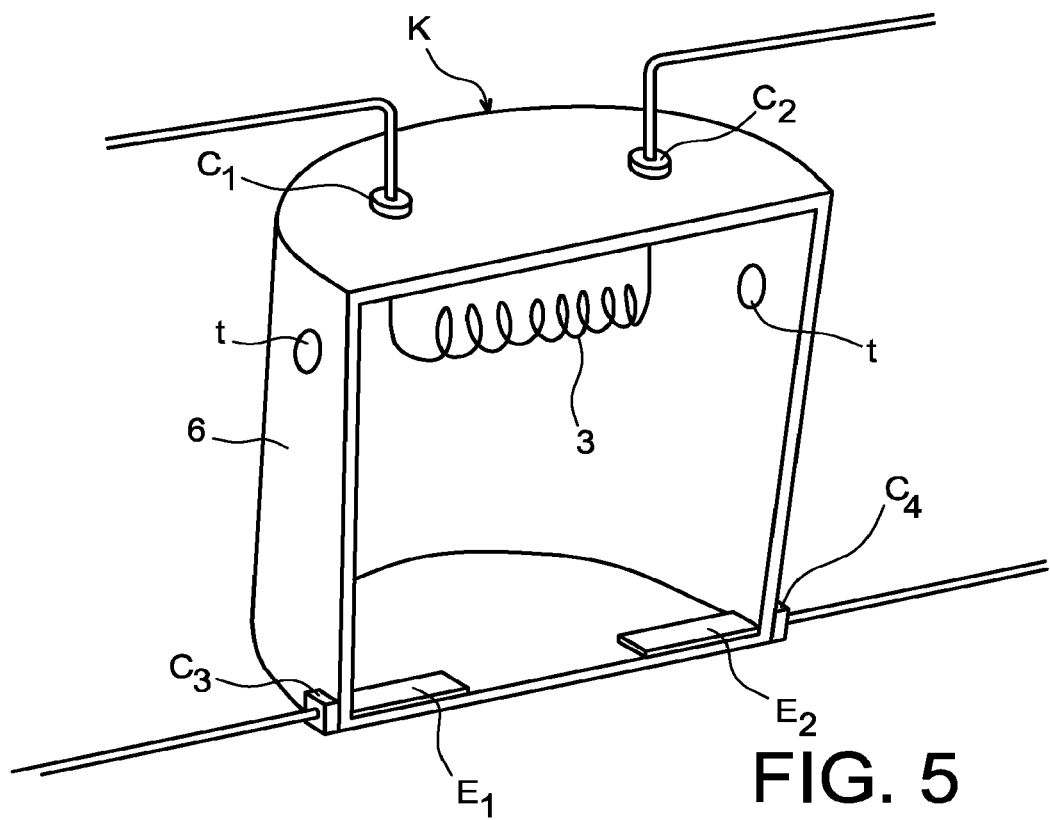
FIG. 5 represents, by way of non-limiting example, a cross-section view of a component which takes part in the device for closing the electrical power supply circuit of an electric apparatus of the invention.

FIG. 5 illustrates, by way of non limiting example, a component K consisting of the enclosure 6, the open circuit and the element made of electrically conductive material 3. The enclosure 6 consists, of a cylindrical wall closed, at each of its two ends, with a plate. The element made of electrically conductive material 3 and the open circuit defined between the ends $E_1$ and $E_2$ are located inside the enclosure. The element made of electrically conductive material 3 is attached to one of the two plates whereas the open circuit is formed, facing said element, on the plate opposite to the plate where the element 3 is attached. The open circuit is formed by the absence of metallisation which exists, on the plate, between the ends $E_1$ and $E_2$ of metallic tracks formed on the plate. Electrical connectors $C_1$ and $C_2$ connect the element made of electrically conductive material 3 to the electrical circuit of the mesh $M_1$ located outside the enclosure 6 and the electrical connectors $C_3$ and $C_4$ connect the respective ends $E_1$ and $E_2$ of the metallic tracks to the electrical circuit of the mesh $M_2$ located outside the enclosure 6. Through holes "t" are formed in the cylindrical wall of the enclosure 6 in order to create a communication between the inside and the outside of the enclosure. The pressure in the enclosure 6 is then equal to the pressure in the chamber EV.

Figure 2A:
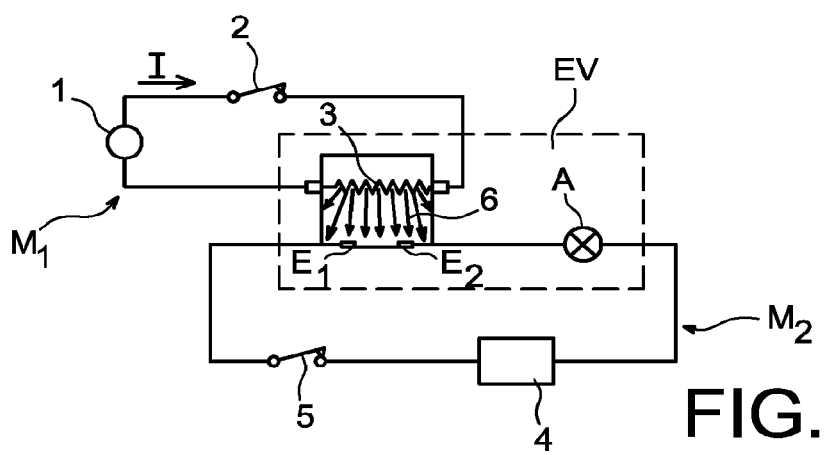
FIG. 2A and FIG. 2B illustrate the operation of the device represented in FIG. 1.
Figure 2B:
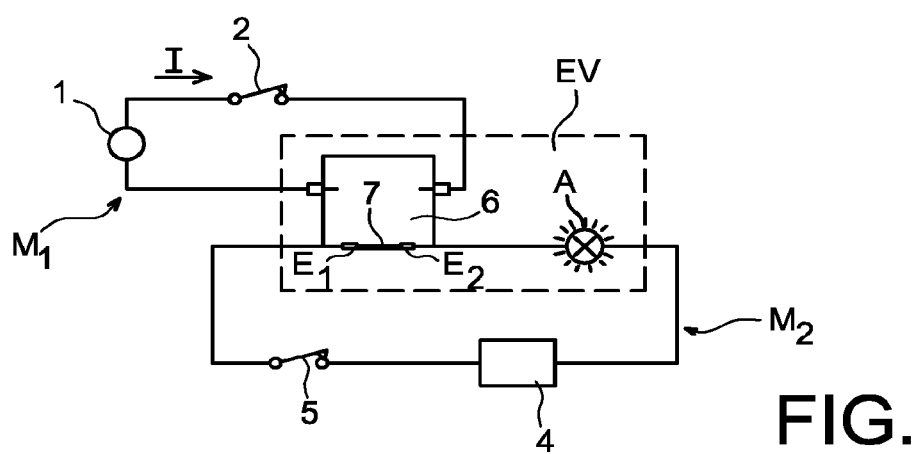

The operation of the device for closing the power supply circuit of the electric apparatus of the invention is described below, in reference to FIG. 2A, FIG. 2B and FIG. 6.

The closure of the electrical circuit of the mesh $M_1$ is made by closing the switch 2. Once the switch 2 is closed, the electrical source 1 delivers a current pulse which flows in the mesh $M_1$ and heats the material of the element 3. If the pressure conditions which exist in the chamber EV are proper, once the temperature of the material reaches a given value, there is a sublimation of the material which then switches from a solid state to a gaseous state (see FIG. 2A).

Figure 6:
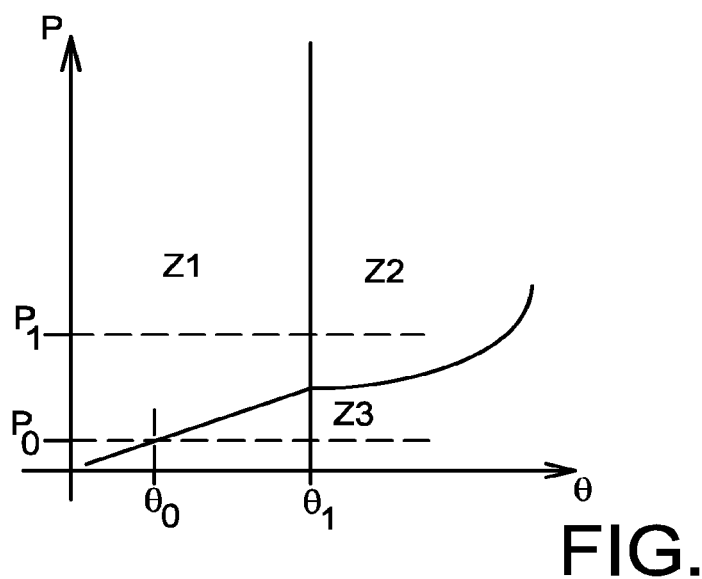
FIG. 6 represents the curve of the pressure P as a function of temperature θ of an electrically conductive material used to make the element made of electrically conductive material which takes part in the device for closing the electrical power supply circuit of the invention.

FIG. 6 represents the pressure P/temperature θ diagram of an electrically conductive material used for making the element 3. Three zones Z1, Z2, Z3 appear in FIG. 6:
- a zone Z1 defines the pressure/temperature values for which the material is solid;
- a zone Z2 defines the pressure/temperature values for which the material is liquid;
- a zone Z3 defines the pressure/temperature values for which the material is gaseous.

The conductive material is thereby chosen to switch from a solid state to a gaseous state at the pressure at which the electric apparatus A is to operate.

By way of non-limiting example, for a pressure of 1 Pa, the material chosen is zinc and the sublimation temperature corresponding to this pressure is 344° C.

When the sublimation of the electrically conductive material occurs, the vapour particles of the material condense on the wall of the enclosure and on the plate located in front of the element 3. Advantageously, the vapour particles of the conductive material move with very little risk of collision with other particles. The electrically conductive gas generated by heating the electrically conductive material is projected onto the wall of the enclosure and the plate, without being impeded by diffusion phenomena and without risk of oxidation. When the element 3 has disappeared, a deposit of electrically conductive material 7 connects both conductive ends $E_1$ and $E_2$ (short circuit). Once the switch 5 is closed, the electrical circuit of the mesh $M_2$ is closed and the electric apparatus A operates (see FIG. 2B). The closure of the switch 5 is, as required, simultaneous or subsequent to the closure of the switch 2.

For a range of pressures $P_1$ higher than pressure $P_0$ (see FIG. 6), when the temperature of the electrically conductive material rises, either the material remains in the solid state if the temperature remains below a certain threshold $θ_1$, or the material switches to the liquid state if the temperature exceeds this threshold. No short circuit is then able to be formed between the conductive ends $E_1$ and $E_2$. The electric apparatus thereby cannot operate.

Figure 3:
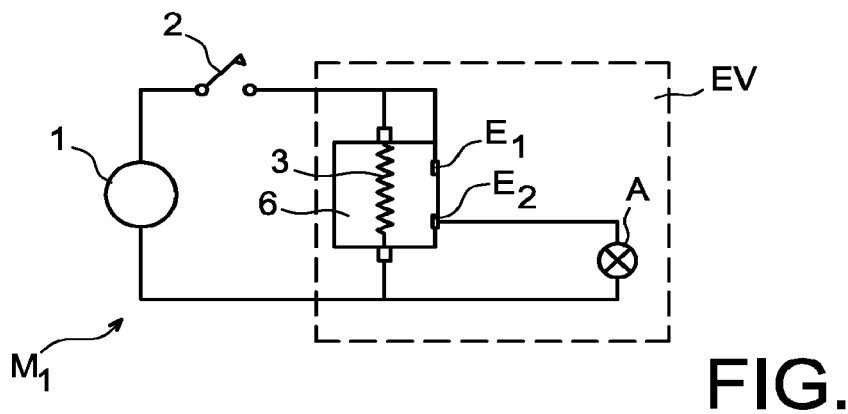
FIG. 3 represents the schematic diagram of a device for closing the electrical power supply circuit of an electric apparatus according a second embodiment of the invention.

FIG. 3 represents the schematic diagram of a device for closing the electrical power supply circuit of an electric apparatus according to a second embodiment of the invention.

According to the second embodiment of the invention, the electrical power supply 4 of the electric apparatus A is made with the electrical source 1 which enables the element made of material 3 to be heated. The device also comprises a first mesh $M_1$ as previously mentioned for the first embodiment of the invention, that is an electrical source 1 in series with a switch 2 and an element of electrically conductive material 3, for example a filament of electrically conductive material. As previously, an open circuit defined by the break in a conductive line faces the element 3, between the ends $E_1$ and $E_2$ of a conductive line break. The electric apparatus A is connected in series with the open circuit and the assembly consisting of the open circuit and the electric apparatus A is connected in parallel with the element 3.

Preferentially, the element 3 and the open circuit are gathered in an open enclosure 6 identical to the one defined for the first embodiment of the invention. As previously, the electric apparatus A is located in a chamber EV at a controlled variable pressure and the pressure in the chamber EV is provided—a priori—to allow for the proper operation of the electric apparatus. Among the different elements described above, in addition to the electric apparatus A, the chamber EV contains at least the open circuit defined between the ends $E_1$ and $E_2$ and the element 3.

Figure 4A:
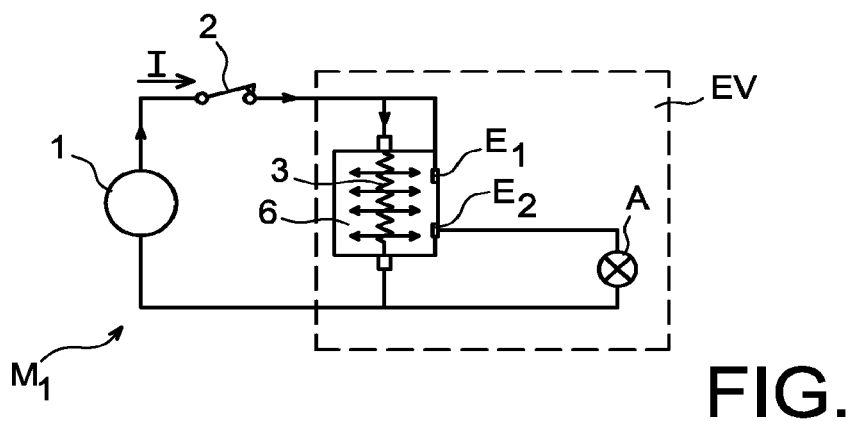
FIG. 4A and FIG. 4B illustrate the operation of the device represented in FIG. 3.
Figure 4B:
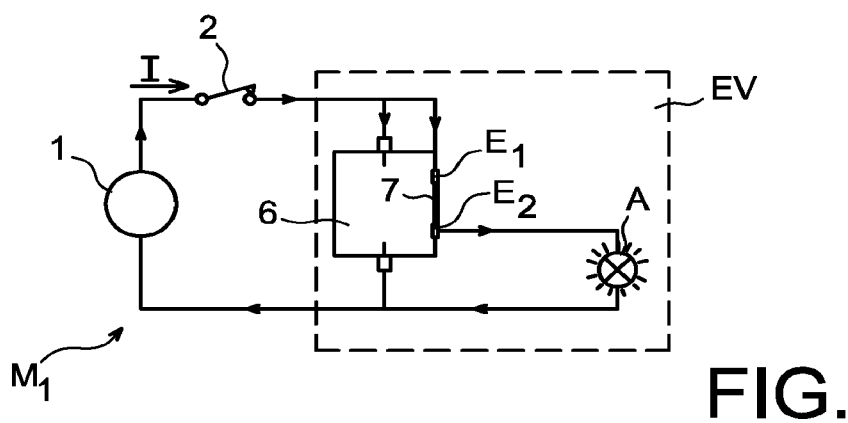

FIG. 4A and FIG. 4B illustrate the operation of the device represented in FIG. 3. The switch 2 is first open. Upon closing the switch, a current pulse flows in the mesh $M_1$. If the conditions of pressure in the chamber EV and of heating of the electrically conductive material are properly set, there is a sublimation of the electrically conductive material (see FIG. 4A) and a formation of a deposit of electrically conductive material 7 between the conductive ends $E_1$ and $E_2$. Once the deposit 7 is formed, the element 3 has disappeared and the electrical source 1 maintains a current in the electric apparatus A (see FIG. 4B).

Advantageously, the electric power supply device of the invention, regardless of its embodiment, is easy to integrate and has a reduced overall dimension. The absence of moving mechanical parts ensures a high reliability of the device.

The invention claimed is:

1. A method for closing an electrical power supply circuit of an electric apparatus located in a chamber at a controlled variable pressure, the electrical power supply circuit comprising an open circuit defined between two electrically conductive terminals, wherein, both electrically conductive terminals being formed on an internal wall made of an electrically insulating material of an enclosure which is open to the pressure of the chamber, the method comprises:
    a heating which provides energy to an element made of electrically conductive material located in the enclosure which is open to the chamber pressure,
    a sublimation of the element made of electrically conductive material once the element made of electrically conductive material reaches a given temperature, if pressure conditions in the chamber correspond to conditions required for an operation of the electric apparatus under vacuum,
    an ejection of vapour particles of the electrically conductive material which result from the sublimation, and
    a formation of a deposit of electrically conductive material between the two electrically conductive terminals as a consequence of the ejection of the vapour particles.

2. The method according to claim 1, wherein, if pressure conditions prevailing in the chamber at a controlled variable pressure does not correspond to the conditions required for operating the electric apparatus under vacuum, the sublimation of the conductive material does not occur and no deposit is formed between said terminals.

3. The method according to claim 1, wherein the element made of electrically conductive material is a filament.

4. The method according to claim 1 wherein the heating is a Joule effect heating.

5. A device for closing an electrical power supply circuit of an electric apparatus located in a chamber at a controlled variable pressure, the electrical power supply circuit comprising an open circuit defined between two electrically conductive terminals of the electrical power supply circuit, the device comprises:
    an enclosure which is open to the chamber pressure, both electrically conductive terminals being formed on an internal wall of the enclosure, the wall being made of an electrically insulating material,
    an element made of an electrically conductive material is located in the enclosure which is open to the chamber pressure, facing the open circuit, and
    a heating device for heating the element made of the electrically conductive material is able to lead to a sublimation of the electrically conductive material of the element once the electrically conductive material reaches a given temperature, if the pressure conditions in the chamber at a controlled variable pressure correspond to the conditions required for operating the electric apparatus under vacuum.

6. The device according to claim 5, wherein the element of electrically conductive material is attached on at least one internal wall of the enclosure and both electrically conductive terminals are made, on the internal wall of the enclosure, by electrically conductive tracks located opposite to each other and facing the element made of electrically conductive material.

7. The device according to claim 5, wherein the heating device comprises a current pulse source connected in series with a switch.

8. The device according to claim 5, wherein the heating device is made by the electrical power supply of the electric apparatus.

9. The device according to claim 5, wherein the element made of electrically conductive material is a filament.

* * * * *